H. M. LAMBERT.
METHOD OF AND APPARATUS FOR MANUFACTURING BELTS.
APPLICATION FILED FEB. 19, 1919.
1,354,569.
Patented Oct. 5, 1920.
2 SHEETS—SHEET 1.
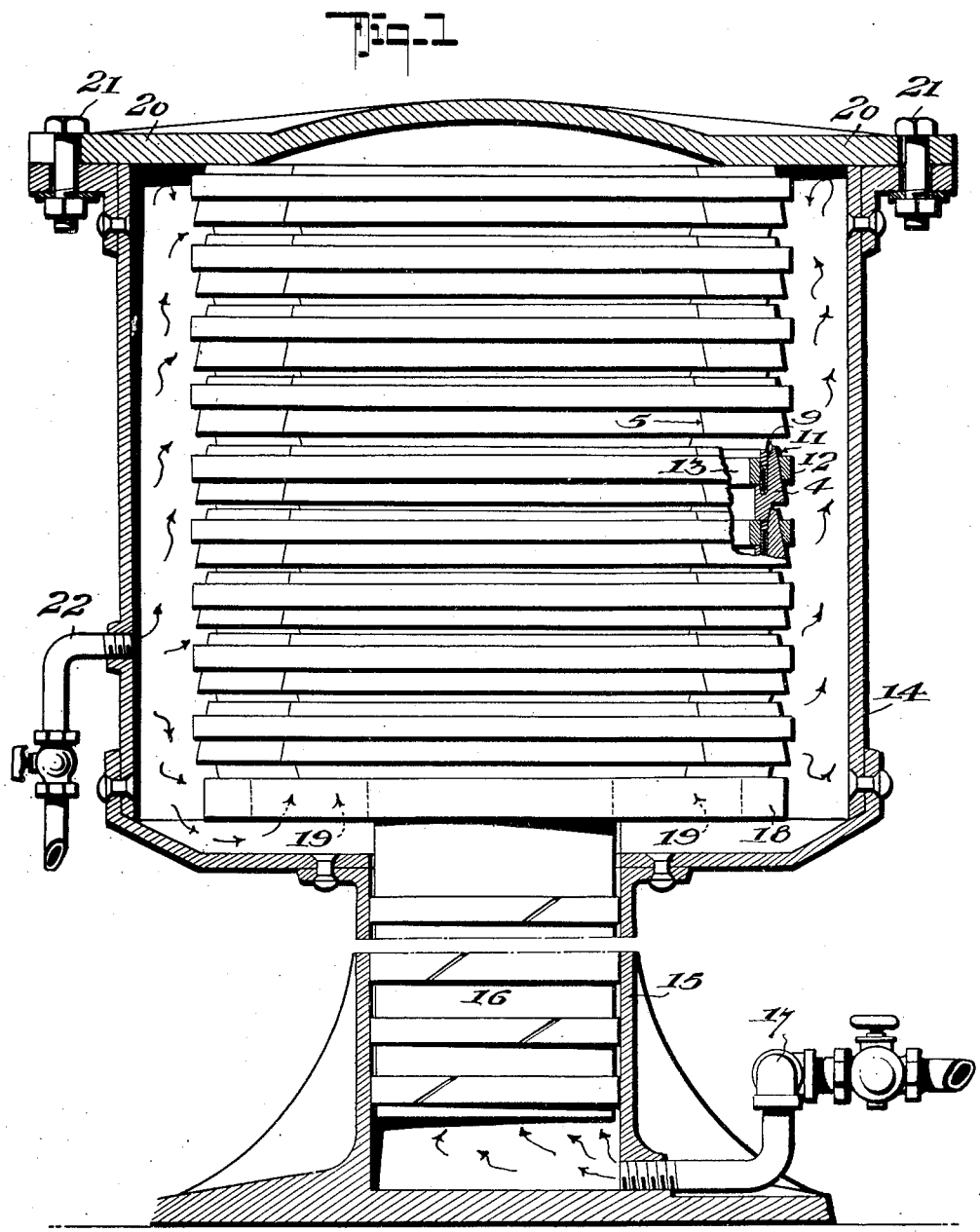
INVENTOR
H. M. Lambert,
BY
Fred G. Dieterich & Co.
ATTORNEYS H. M. LAMBERT.
METHOD OF AND APPARATUS FOR MANUFACTURING BELTS.
APPLICATION FILED FEB. 19, 1919.
1,354,569. Patented Oct. 5, 1920.
2 SHEETS—SHEET 2.
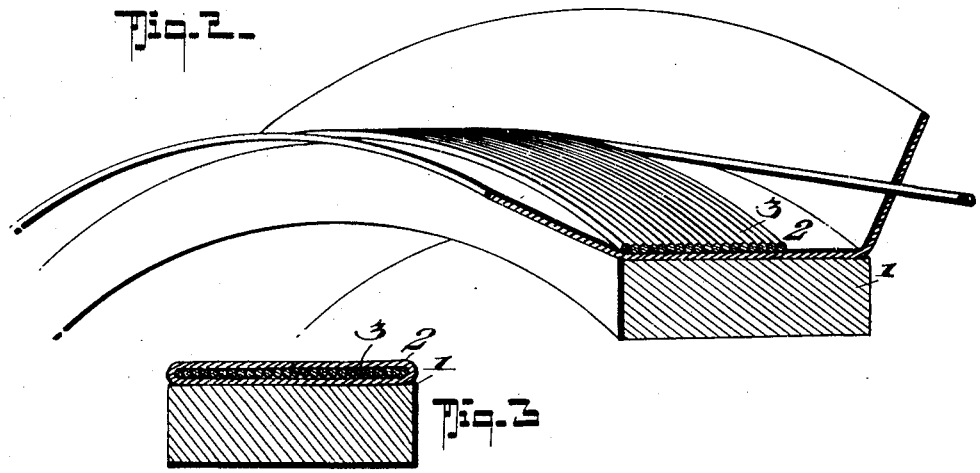
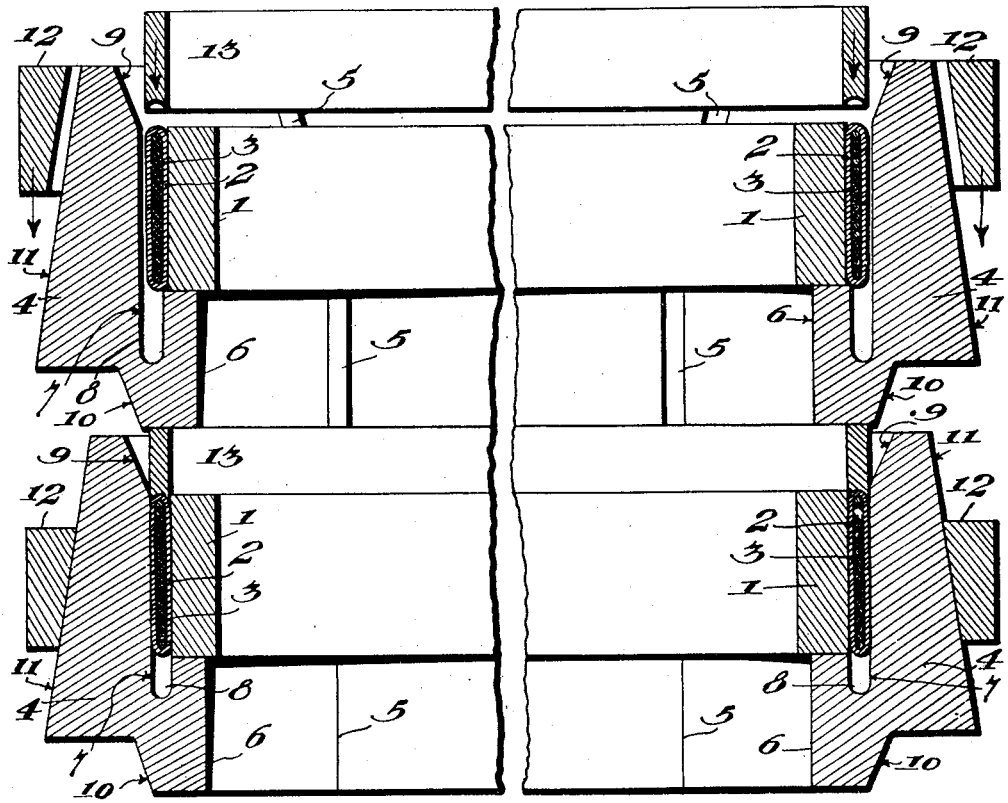
INVENTOR
H. M. Lambert,
BY
Fred G. Dieterich
ATTORNEYS

UNITED STATES PATENT OFFICE.

HENRY M. LAMBERT, OF PORTLAND, OREGON.

METHOD OF AND APPARATUS FOR MANUFACTURING BELTS.

1,354,569.    Specification of Letters Patent.    Patented Oct. 5, 1920.

Application filed February 19, 1919. Serial No. 278,020.

*To all whom it may concern:*

Be it known that I, HENRY M. LAMBERT, a citizen of the United States, at present residing at Portland, in the county of Multnomah and State of Oregon, have invented a new and Improved Method of and Apparatus for Manufacturing Belts, of which the following is a specification.

My invention relates to the art of making stretchless belts of the type disclosed in my Patent No. 1,287,703, issued December 17, 1918, and the apparatus which constitutes a part of my present invention embodies a vulcanizing kettle with means for producing a compression of the mold elements in the kettle and specially constructed mold elements so designed as to be capable of being stacked in the kettle and having provision of interengagement between adjacent units to transmit the compressing forces *seriatim* throughout the stack to the units, and having provision for keeping the several units in alinement so that the pressure of the compressing strain will be exerted in one direction. Hence the several units will be held from slipping one off the other.

In its more detailed nature, the invention includes a mold unit which consists of a central body on which the belt is built up or formed, and a surrounding sectional outer mold that embraces the outside and one end of the belt on the inner body, a clamping or holding device being provided for holding the outer mold sections together.

A compressing plunger that engages the exposed end of the belt and coöperates with the inner and outer mold parts, is adapted to compress the belt to its final dimensions and retain it, under pressure, until vulcanization is complete and the belt has thereby become set.

Again, my invention has for one of its objects to provide a mold consisting of an inner element of ring-like form on which the belt is made up (and when the belt is of the kind disclosed in my patent above referred to, it clings tightly to the inner mold element or ring), an outer sectional mold that receives the inner ring and the belt thereon, and has a pocket into which more or less of the belt is forced (during the compression act) from the ring, a plunger ring which engages the exposed edge of the belt and acts in the cavity between the inner and outer mold elements, forces the belt, more or less, off the inner mold ring and into the outer mold pocket and at the same time compresses the belt structure to the desired degree, there being clamping means provided for holding the outer mold sections together.

An object of this arrangement is to provide means for the ready removal of the finished belt from the mold parts, after vulcanization.

In its more detailed nature, the invention also embodies those novel features of construction, combination and arrangement of parts, all of which will be first fully described and then be specifically pointed out in the appended claims, reference being had to the accompanying drawings, in which:

Figure 1 is a vertical section of a vulcanizing kettle, the ram and molds being shown in elevation, and parts being broken away.

Fig. 2 is a detail perspective sectional view showing how the belt is built up on the inner mold ring.

Fig. 3 is a cross section of the ring showing the belt ready for vulcanization.

Fig. 4 is a vertical section of two mold units, the lower one having its outer sections clamped tightly in place, while the upper one is just receiving the clamping ring, the plunger ring being shown ready for placing in position.

Fig. 5 is a detail section of a modification in which the depth of the outer mold section pocket is but slight.

In the drawings in which like numerals and letters of reference designate like parts in all of the figures, 1 is the inner form or ring member on which the belt is built up in the usual way (see my patent above referred to).

2 designates the fabric which is first placed on the ring 1 and 3 indicates the rubberized cord which is tightly wound spirally around the fabric, after which the fabric is closed over, as shown in Fig. 3, it being understood that the fabric is a rubberized fabric. After the belt has been formed on the ring 1, the ring is placed within the sectional outer mold. This mold is composed of a plurality of sections 4, separable one from another, at 5, and having a restricted annular portion 6 to form a seat for the ring 1.

The sections 4 also have a straight annular wall 7 to embrace the outside of the belt (see lower part of Fig. 4), when the sections are brought together by the action of the ring 12 that engages the coniform face 11 of the outer mold members.

8 designates a pocket of cross sectional width corresponding to the final thickness of the finished belt, the pocket 8 registering with the belt on the ring 1.

The mouth of the outer mold is beveled at 9, and, at the other end, the mold is provided with an outer beveled wall 10, so that the walls 9 and 10 of adjacent molds will match, when the molds are assembled in the vulcanizer (see Fig. 1).

The purpose of the bevels 9 and 10 is to center adjacent mold units within one another and also to serve as a stop to limit the movement of the mold parts toward one another during the compressing of the same by the piston action.

13 is the plunger ring which is adapted to fit between the ring 1 and the wall 7 of the outer mold members and to be engaged by the end of a mold above.

When the molds are placed in the vulcanizer, the rings 13 force the belts, more or less, off the rings 1 into the pockets 8 (depending on the depth of the pockets 8) and apply to the belts the necessary compression strains to compact the mass thereof during the vulcanizing period.

The vulcanizing kettle 14 may be of the ordinary construction and it is provided with a pedestal 15 in which the plunger 16 works, the plunger 16 carrying the piston plate 18 on which the mold units are set one on top of the other (see Fig. 1). The plates 18, of course, have suitable steam passages 19, so that the steam admitted into the kettle through the duct 22 may have free circulation around the outer mold members as well as through the center of the same.

17 designates the pipe from the source of power supply which may be compressed air, water or other fluid for exerting pressure on the plunger 16 to force the piston plate 18 upwardly and compress the several mold units, whereby to cause the rings 13 thereof to exert the required compression forces on the respective belts within the several units.

The top 20 of the kettle is removably secured at 21 in any suitable way.

As soon as the vulcanization has taken place, the top 20 is removed, the plunger 16 raised and the mold units taken out, after which the ring 12 of the respective unit is driven off and the outer mold sections 4 can readily be removed, the plunger rings 13 being likewise easily removable.

As the belt only has been forced somewhat off the ring 1, it leaves sufficient of the belt projecting over the edge of the ring to enable it to be gripped and easily pulled off of the ring 1, should it have any tendency to stick to the ring, after the vulcanization act has been completed, or the ring 13 can be used to effect the removal.

From the foregoing description taken in connection with the accompanying drawings, it is thought the complete construction and operation and advantages of the apparatus will be clear to those skilled in the art as well as the method employed in forming and vulcanizing the belt.

What I claim is:

1. The method of manufacturing belts which consists in building the belt on a form, entirely inclosing the belt and form in a conforming mold, applying pressure to the belt mass while confined, and vulcanizing the belt while confined under such pressure and subsequently removing the article from the form.

2. The method of manufacturing belts which consists in building the belt on a form, inclosing the belt and form in a conforming mold, applying pressure edgewise to the belt mass while confined and vulcanizing the belt while confined under such pressure, then subsequently removing the article and form from the mold and removing the article from the form.

3. The method of manufacturing belts which consists in building the belt on a form, inclosing the belt and form in a conforming mold, applying pressure edgewise to the belt mass while confined to force the article, more or less, off the form and compress the mass, and vulcanizing the mass while under pressure and subsequently removing the article from the mold and form.

4. As a new article, a vulcanizing mold unit comprising a form ring, a sectional outer mold having provisions for receiving said ring, means by which the parts of said outer mold may be clamped together around the article on the form ring, a compressing plunger ring adapted to be inserted between said form ring and said outer mold and engage the article to compress the article while confined between the form ring and the outer mold.

5. As a new article, a vulcanizing mold unit comprising a form ring, a sectional outer mold having provisions for receiving said ring, means by which the parts of said outer mold may be clamped together around the article on the form ring, a compressing plunger ring adapted to be inserted between said form ring and said outer mold and engage the article to compress the article while confined between the form ring and the outer mold, said outer mold having a beveled mouth and a similarly beveled projection at the end opposite the mouth, whereby the molds of adjacent units will fit into one another, when two or more units are assembled.

6. In a belt making apparatus, a vulcanizing kettle, a plurality of mold units in said kettle, said units each comprising an outer sectional mold member with means for clamping the sections together, an inner form member adapted to be received within and be supported by the outer mold member and on which the article is adapted to be formed, said form member and said outer mold member being spaced apart to form a "pocket" for the article, a plunger member adapted to enter said "pocket" and apply pressure against the article in the pocket, and means for applying pressure against the plunger, and means for admitting steam into the kettle.

7. In a belt making apparatus, a vulcanizing kettle, a plurality of mold units in said kettle, said units each comprising an outer sectional mold member with means for clamping the sections together, an inner form member adapted to be received within and be supported by the outer mold member and on which the article is adapted to be formed, said form member and said outer mold member being spaced apart to form a "pocket" for the article, said outer member having a "sub-pocket" into which a part of the article is adapted to be forced from the form member, a plunger member adapted to enter said "pocket" and apply pressure against the article in the pocket and means for applying pressure against the plunger and means for admitting steam into the kettle.

8. In a belt making apparatus, a vulcanizing kettle, a plurality of mold units in said kettle, said units each comprising an outer sectional mold member with means for clamping the sections together, an inner form member adapted to be received within and be supported by the outer mold member and on which the article is adapted to be formed, said form member and said outer mold member being spaced apart to form a "pocket" for the article, a plunger member adapted to enter said "pocket" and apply pressure against the article in the pocket, said outer mold member having its end adjacent to the plunger member formed to receive the opposite end of an adjacent mold unit, whereby the several units will maintain alinement, and means for forcing the several units together to cause the respective plunger members to function.

HENRY M. LAMBERT.